(12) United States Patent
Wang et al.

(10) Patent No.: US 8,346,760 B2
(45) Date of Patent: *Jan. 1, 2013

(54) METHOD AND APPARATUS TO IMPROVE EXECUTION OF A STORED PROGRAM

(75) Inventors: Hong Wang, Fremont, CA (US); John Shen, San Jose, CA (US); Ali-Reza Adl-Tabatabai, Santa Clara, CA (US); Anwar Ghuloum, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 12/469,583

(22) Filed: May 20, 2009

(65) Prior Publication Data
US 2009/0241097 A1    Sep. 24, 2009

Related U.S. Application Data

(62) Division of application No. 10/746,421, filed on Dec. 24, 2003, now Pat. No. 7,580,914.

(51) Int. Cl.
*G06F 17/30* (2006.01)
(52) U.S. Cl. .......... 707/720; 712/205; 712/206; 712/217
(58) Field of Classification Search .................. 712/221, 712/205, 206, 217; 707/720
See application file for complete search history.

(56) References Cited

U.S. PATENT DOCUMENTS

| | | | | |
|---|---|---|---|---|
| 5,293,500 A * | 3/1994 | Ishida et al. | ................ | 712/217 |
| 5,404,551 A * | 4/1995 | Katsuno | ................ | 712/23 |
| 5,794,003 A * | 8/1998 | Sachs | ................ | 712/215 |
| 5,978,830 A * | 11/1999 | Nakaya et al. | ................ | 718/102 |
| 6,144,982 A | 11/2000 | Panwar | | |
| 6,721,944 B2 * | 4/2004 | Chaudhry et al. | ................ | 717/154 |
| 7,213,137 B2 * | 5/2007 | Boom et al | ................ | 712/245 |
| 7,328,294 B2 * | 2/2008 | Kim et al. | ................ | 710/260 |
| 7,350,191 B1 * | 3/2008 | Kompella et al. | ................ | 717/108 |
| 7,395,408 B2 * | 7/2008 | Tanaka et al. | ................ | 712/24 |
| 7,406,688 B2 * | 7/2008 | Shibayama et al. | ................ | 718/102 |
| 7,508,806 B1 * | 3/2009 | Shah et al. | ................ | 370/342 |
| 2001/0049763 A1 * | 12/2001 | Barry et al. | ................ | 710/264 |
| 2002/0073299 A1 | 6/2002 | Pechanek et al. | | |
| 2002/0144098 A1 | 10/2002 | Wang et al. | | |
| 2002/0157000 A1 * | 10/2002 | Hay et al. | ................ | 712/239 |
| 2003/0149865 A1 | 8/2003 | Kadambi | | |
| 2003/0182534 A1 | 9/2003 | Harthcock | | |
| 2004/0059891 A1 * | 3/2004 | Luick | ................ | 712/206 |
| 2004/0060041 A1 | 3/2004 | Demsey et al. | | |
| 2004/0133765 A1 * | 7/2004 | Tanaka et al. | ................ | 712/215 |
| 2004/0220959 A1 | 11/2004 | Rothman et al. | | |
| 2005/0102460 A1 | 5/2005 | Wahler | | |
| 2006/0020731 A1 * | 1/2006 | Sasage | ................ | 710/264 |

(Continued)

OTHER PUBLICATIONS

Kip R. Irvine, "Assembly Language for the IBM PC", Macmillan Publishing Company, 1990.

(Continued)

*Primary Examiner* — Thanh-Ha Dang
(74) *Attorney, Agent, or Firm* — Blakely, Sokoloff, Taylor & Zafman LLP (57) ABSTRACT

In one embodiment, the invention provides a method comprising determining metadata encoded in instructions of a stored program; and executing the stored program based on the metadata.

15 Claims, 7 Drawing Sheets

U.S. PATENT DOCUMENTS

2008/0244239 A1* 10/2008 DeWitt et al. .................. 712/220

OTHER PUBLICATIONS

First Office Action from foreign counterpart China Patent Application No. 200410104854.0 mailed Jan. 26, 2007, 8 pages.
Second Office Action from foreign counterpart China Patent Application No. 200410104854.0 mailed May 30, 2008, 8 pages.
Third Office Action from foreign counterpart China Patent Application No. 200410104854.0 mailed Nov. 21, 2008, 8 pages.
Notice of Grant of Patent Right for Invention from foreign counterpart China Patent Application No. 200410104854.0 mailed May 8, 2009, 3 pages.
Translation of the Office Action Notice from foreign counterpart Taiwan Patent Application No. 93139522 mailed Dec. 6, 2007, 8 pages.
Allowance Decision from foreign counterpart Taiwan Patent Application No. 93139522 mailed Dec. 6, 2007, 8 pages.

* cited by examiner

| VECTOR | INTERRUPT DESCRIPTOR | METADATA |
|---|---|---|
| 1 | MOUSE | ASYNCHRONOUS |
| 2 | DISK | ASYNCHRONOUS |
| 3 | DATA PACKET RECEIVED | ISOCHRONOUS |
| | | |

FIG. 7

METHOD AND APPARATUS TO IMPROVE EXECUTION OF A STORED PROGRAM

RELATED APPLICATIONS

This application is a divisional of U.S. application Ser. No. 10/746,421, filed Dec. 24, 2003 now U.S. Pat. No. 7,580,914.

FIELD OF THE INVENTION

At least one embodiment of the invention relates to optimizing the processing of instructions in a processor.

BACKGROUND

Compilers for compiling a program written for managed run-time environments such as JAVA and .Net generally produce a great deal of information about the program. Such information hereinafter referred to as "metadata" includes information about data objects types, methods that operate on the data objects, dominant patterns of high-level program behavior, etc. This metadata information, if available to a processor, could be used to improve the speed of program execution.

BRIEF DESCRIPTION OF THE DRAWINGS

FIG. 2 shows a high-level block diagram of a processor for the system of FIG. 1;

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
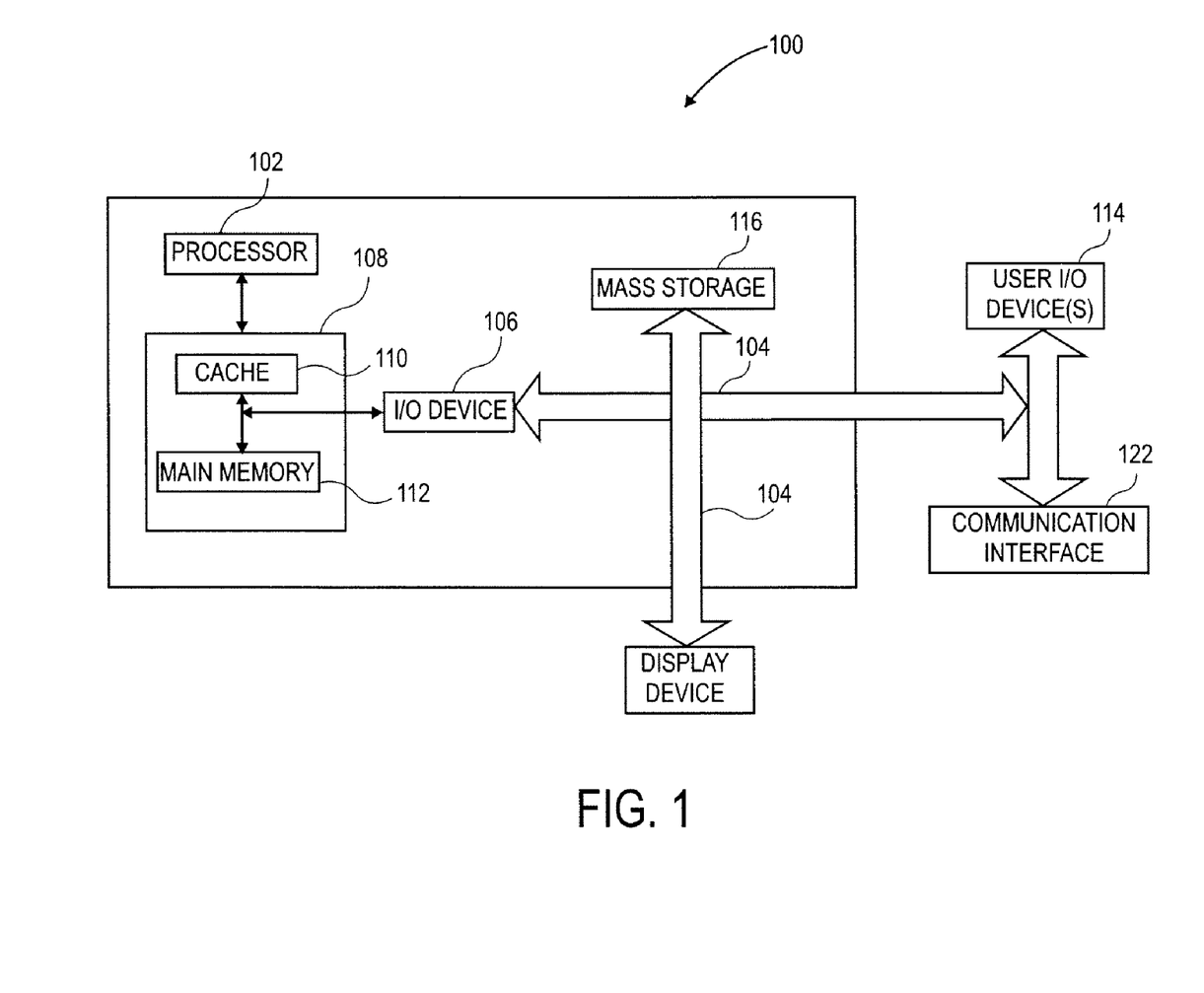
FIG. 1 shows a high-level block diagram of a system in accordance with one embodiment of the invention.

FIG. 1 shows a typical general purpose computer system 100 including a processor 102 in accordance with one embodiment of the present invention. The computer system 100 in accordance with one embodiment of the present invention comprises an address/data bus 104 for communicating information. The processor 102 is coupled via the bus 104 to Input/Output (I/O) device 106 for processing data and executing instructions. A memory system 108 is coupled with bus 104 for storing information and instructions for the processor 102. The memory system 108 comprises, for example, cache memory 110 and main memory 112. The main memory includes a stored program (not shown) that is produced by a compiler and includes metadata as described below. The stored program is to be executed by the processor 102. The cache memory 110 includes one or more levels of cache memory. In a typical embodiment, the processor 102, the I/O device 106, and some or all of the cache memory 110, may be integrated in a single integrated circuit.

User I/O devices 114 are coupled to the bus 104 and are operative to communicate information in appropriately structured form to and from the other parts of the computer system 100. The user I/O devices 114 may include a keyboard, mouse, card reader, magnetic or paper tape, magnetic disk, optical disk, or other available input devices, including another computer.

A mass storage device 116 is coupled to bus 104 and may be implemented using one or more magnetic hard disks, magnetic tapes, CDROMs, large banks of random access memory, or the like. A wide variety of random access, and read only memory technologies are available and are equivalent for purposes of the present invention. The mass storage 116 may include computer programs and data stored therein. Some or all of the mass storage 116 may be configured to be incorporated as part of the memory system 108.

In a typical computer system 100, the processor 102, the I/O device 106, the memory system 108, and the mass storage device 116, are coupled to the bus 104 formed on a printed circuit board and integrated into single housing. However, the particular components chosen to be integrated into a single housing is based upon market and design choices. Accordingly, it is expressly understood that fewer or more devices may be incorporated within the housing suggested by 118.

A display device 120 is used to display messages, data, a graphical or command line user interface, or other communications with a user. The display 120 may be implemented, for example, by Cathode Ray Tube (CRT) monitor, Liquid Crystal Display (LCD), or any available equivalent. A communication interface 122 provides communications capability to other devices via a network interface card (NIC) (not shown).

Figure 2:
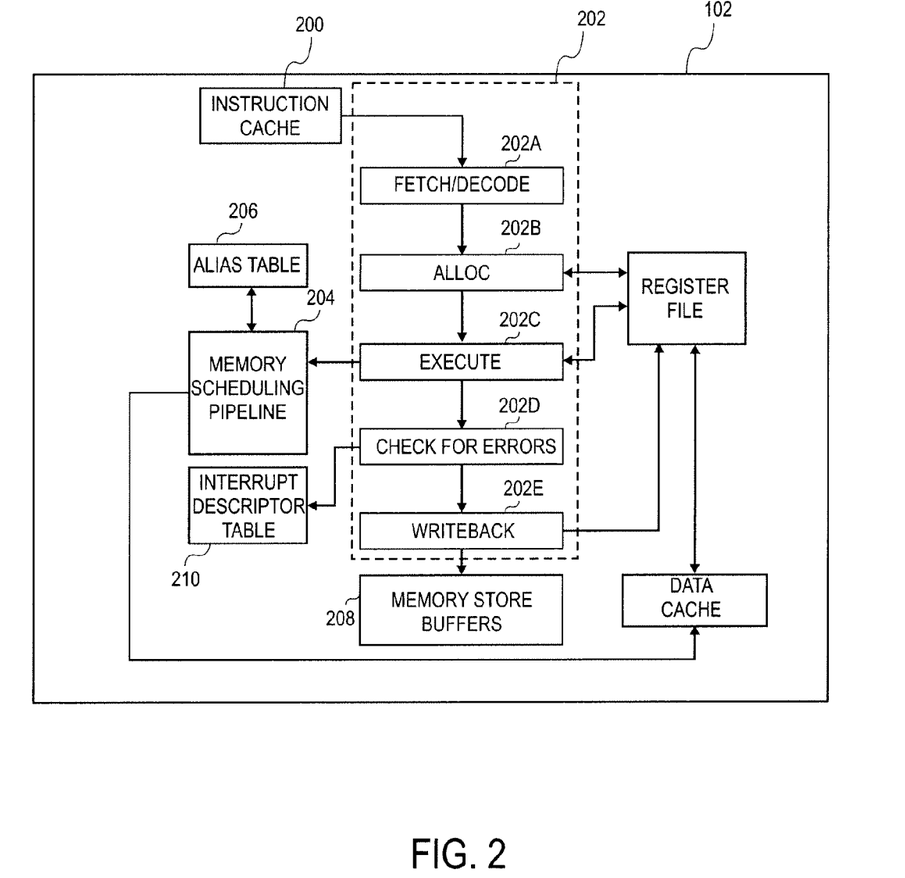
FIG. 2 shows a high-level block diagram of a processor of the system of FIG. 1, in accordance with one embodiment of the invention.

FIG. 2 of the drawings shows the components of the processor 102, in greater detail. As will be seen, the processor 102 includes an instruction cache 200 to cache instructions and to feed the cached instructions into a processing pipeline indicated by reference numeral 202. The processing pipeline 202 includes fetch/decode logic 202A, logic 202B to allocate or schedule resources for instruction execution; logic 202C to execute instructions; logic 202D to check for exceptions or events such as interrupts after execution; and logic 202E to write back or retire instructions after execution. Although the processor 102 is shown to include only one processing pipeline 202, embodiments of the processor 102 may include more than one processing pipeline 202.

In one embodiment, instructions in the instruction cache 200 are encoded with metadata produced by a compiler and which includes type information about data, type information about instructions, time scale sensitivity information about interrupts/events, etc. This type of metadata is known as static metadata since it is not produced dynamically during program execution. Metadata produced during program execution is known as dynamic metadata. In general, the metadata comprises application or program-specific information that may be used by the processor 102 in order to speed up processing of the application. As an example of metadata that comprises application-specific type information, consider an application program that instantiates two independent data structures, one containing employee information, and the other containing organization information. If the program contains the following operation sequence:

```
st O // st is a store operation
ld E // ld is a load operation
```

The ld E operation cannot be hoisted and executed earlier in the pipeline since the value of the ld E operation may be dependent on the result of the preceding st O operation. Thus, without further disambiguating information, the processor cannot advance the ld E operation above "st O". However, if metadata produced by a compiler can be encoded in encodings for the ld and st operations, then the metadata in the encoding may be used by the processor to make the determination that the ld E operation is not dependent on the st O operation. Thus, the ld E operation may be performed earlier in the pipeline, which is beneficial from a performance point of view, or alternatively, may be performed in a separate pipeline entirely.

The metadata produced by a compiler may be encoded as a new opcode supported by an instruction set architecture (ISA). Alternatively, for backward compatibility, an existing operand such as the no-OP (NOP) operand such as that of the nop inst of IA 64 architecture may be used. In one embodiment, unused bits of an existing instruction template may be used to encode the metadata information. For example, suppose that an existing instruction has the following format:

[Opcode], [source operand], [destination operand], [unused bits], then the unused bits may be used to encode the metadata.

In other embodiments, the compiler may label particular memory ranges by instruction type, or by data type. For example, in the case of the employer and organization data structures referred to above, a first memory range may be labeled or allocated by a compiler to hold only employee information, whereas a second memory range may be allocated or labeled by the compiler to hold only organization information. Such a partitioning of memory into distinct areas in accordance with type information can be used by the processor to optimize processing performance, as will be described in greater detail below.

Besides type information, metadata may comprise information about particular events. For example, in one embodiment, time scale sensitivity information for interrupts may be encoded in an instruction in order to assist the processor in prioritizing the order in which the interrupts should be handled, as will be described in greater detail blow.

In one embodiment, the output of the fetch/decode logic 202A includes an instruction word and metadata associated with the instruction word. The resource allocation/scheduling logic 202B schedules the instruction for execution based on the metadata associated with the instructions. For example, suppose that a store instruction has an operand address in the memory range 1 of FIG. 3, whereas a load instruction has an operand address in the memory range 2 of FIG. 3. Ordinarily, without metadata information it is impossible to determine if the load and store operations alias without calculating the addresses of the operands. In one embodiment, because the load and store operations have different metadata, the processor can safely make the assumption that they do not alias and can thus perform load bypassing in order to optimize performance. For example, in one embodiment, the logic 202C may perform the load operation before the store operation, or in an alternative pipeline. In another embodiment, the resource allocation/scheduling logic 202B allocates particular memory registers (not shown) for the exclusive use in processing instructions having a particular metadata tag associated therewith.

The execute logic 202C of the pipeline 200 is responsible for the execution of instructions using one or more functional units such as arithmetic and logic units (ALUs) (not shown). In one embodiment, the execute logic 202C feeds instructions into a memory scheduling pipeline 204. In one embodiment, the memory scheduling pipeline 204, accesses an alias table 206 in order to determine if there is metadata associated with the address of an instruction. The alias table 206 is a hardware table which may, in one embodiment, contain a memory range to metadata mapping.

Figure 3:
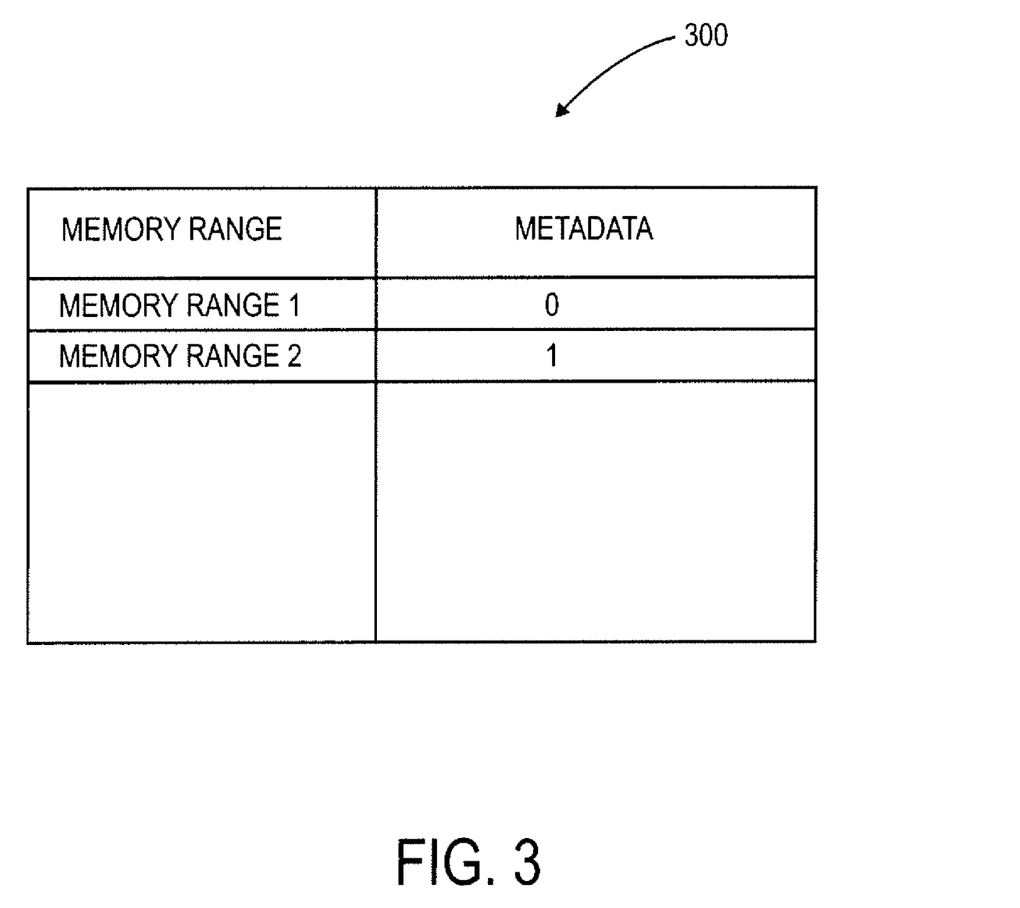
FIG. 3 shows an example of an alias table implemented in the processor of FIG. 1.

FIG. 3 of the drawings shows an example 300 of such a mapping. As will be seen, the memory range 1 is mapped to a metadata tag 0, and the memory range 2 is mapped to a metadata tag 1. Part of the function of the logic 202E includes updating the alias table 206, before finally retiring an instruction. In one embodiment, an architecturally visible instruction may be provided to allow a programmer to allocate memory ranges for specific programs/applications. The new instruction may have the following format:

[write-memory-range] [address], [length] [metadata tag].

Figure 4:
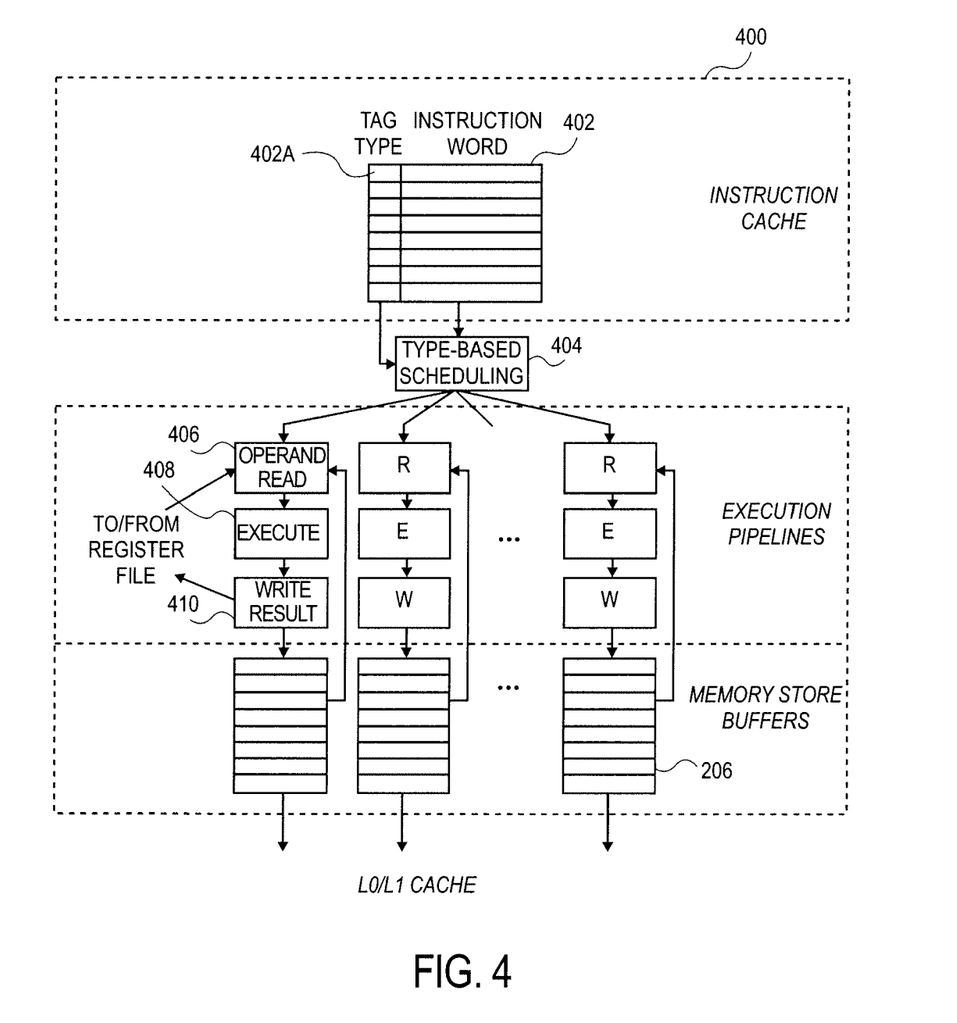
FIG. 4 shows an example of how metadata in the form of a type tag associated with an instruction may be used to implement type-based scheduling.

FIG. 4 of the drawings shows an example of how metadata in the form of a type tag associated with an instruction word may be used by the logic 202B to implement type-based scheduling in order to improve performance. Referring to FIG. 4 of the drawings, an instruction cache 400 includes a plurality of instruction words 402, each having a type tag, 402A associated therewith. The reference numeral 404 indicates a type based scheduler implemented by the resource allocation/scheduling logic 202B. The type based scheduler 404 creates a number of parallel streams each comprising an operand read operation 406, an execute operation 408, and a write result operation 408. The operand read operation 406 and the execute operation 408 are performed by the execution logic 202C of FIG. 2. The write result operation 408 is performed by the writeback logic 202E of FIG. 2. Thus, it can be seen that the resource allocation/scheduling logic 202B spawns a number of parallel independent execution streams in order to speed up processing of an application. A result of the execution in each of the independent streams is written into memory store buffers 206.

Figure 5:
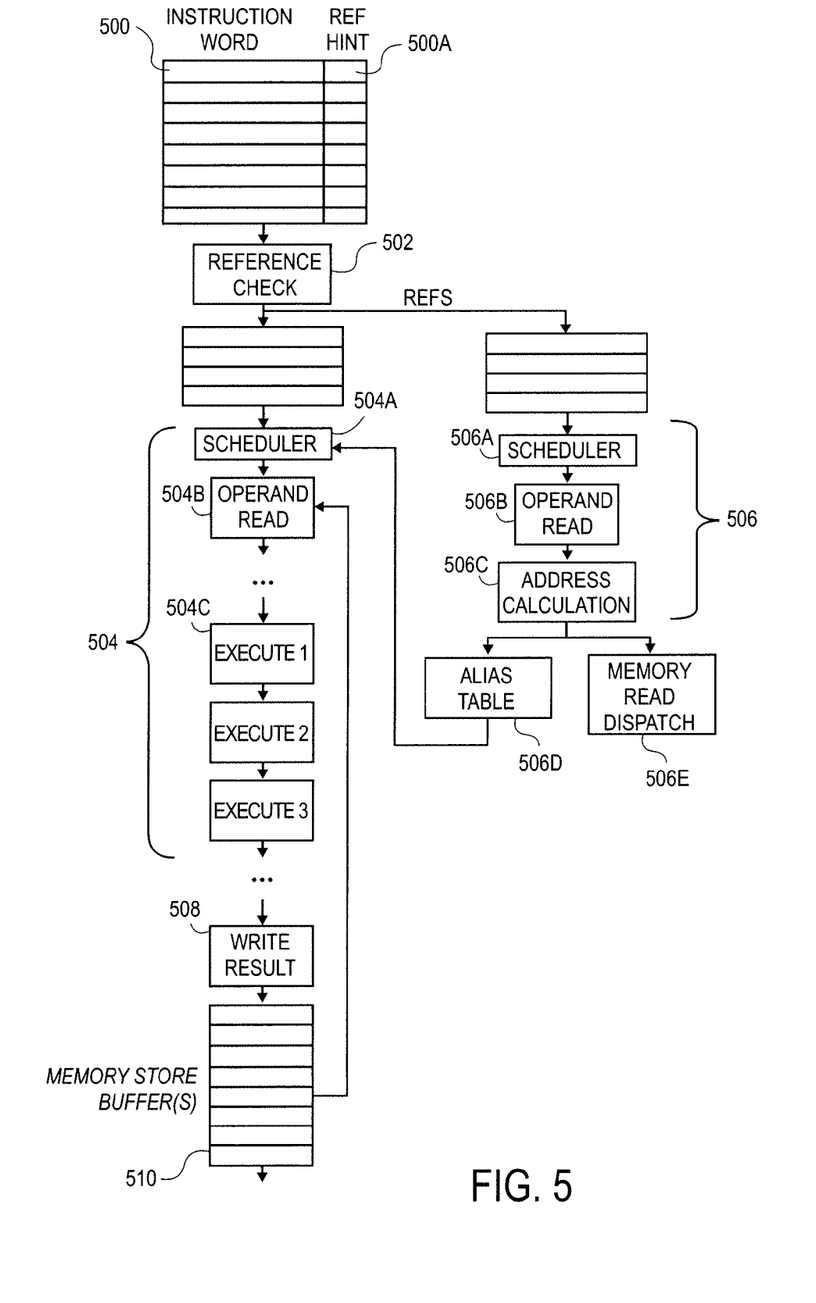
FIG. 5 shows an example of reference address calculation based on metadata, in accordance with one embodiment of the invention.

Referring now to FIG. 5 of the drawings, resource allocation/scheduling by the logic 202B in accordance with another embodiment, based on metadata, is illustrated. As will be seen, instruction words comprising metadata in the form of a reference hint 500A are fed into a reference checking stage 502 which may be implemented by the logic 202B of FIG. 2. The reference checking stage 502 checks a reference 500A associated with an instruction word 500 and spawns two separate pipelines 504 and 506 based on the reference. The pipeline 504 is for performing arithmetic and logical operations, whereas the pipeline 506 is for performing address calculation for references or pointers. The rationale for this approach is to allow for the pipeline 506 to compute instructions associated with a reference hint or tag 500A more quickly and more speculatively than would otherwise be the case. In effect, the pipeline 506 races ahead performing memory operations which could lead to a more aggressive prefetching of data. Each instruction word 500 together with its reference tag or hint 500A is steered into the pipeline 506. As will be seen, the pipeline 506 includes a scheduling stage 506A, an operand read stage 506B, and an address calculation stage 506C. Each of the stages of the pipeline 506 may be performed in the memory scheduling pipeline of 204 of FIG. 2. Once the addresses are calculated, an alias table 506D, similar to the alias table 206 of FIG. 2, is checked in order to identify opportunities for load-store disambiguation. If there are opportunities for load-store disambiguation, then control passes to the pipeline 504. A memory read operation is dispatched at 506E in order to obtain the values of operands from memory. The pipeline 504 includes a scheduling operation 504A, an operand read operation 504B, and one or more execution stages 504C. After execution in the pipeline 504, the results of the execution are architecturally committed or written at 508. The scheduling operation 504A may be performed by the resource allocation/scheduling logic 202B, of FIG. 2, whereas the operand read and execution stages 504C may be performed by the execution logic 202C. The result of write result stage 508 may be performed by the writeback logic 202E of FIG. 2. The results of the processing shown in FIG. 5 of the drawings are written into a memory store buffer 510.

Figure 6:
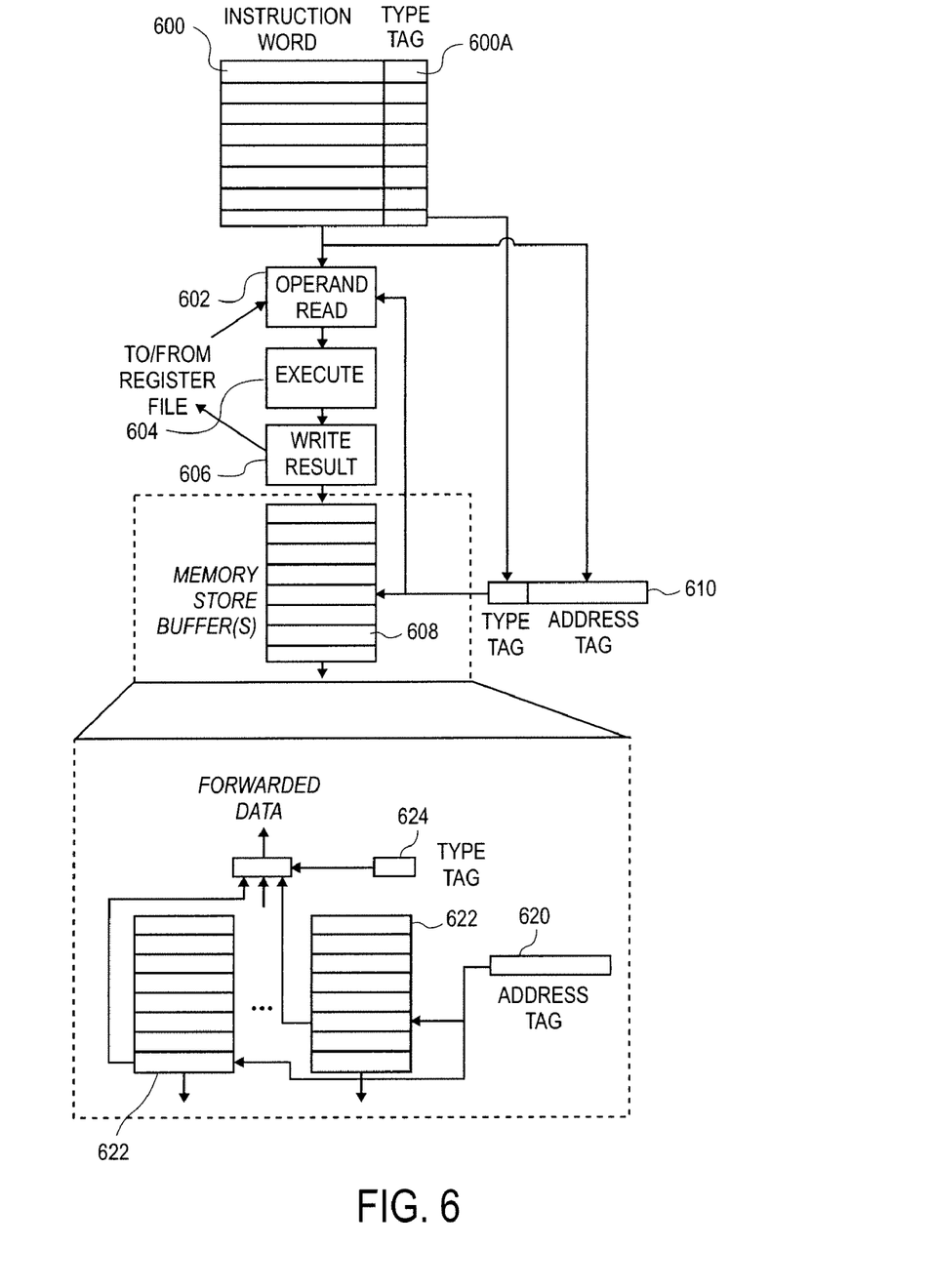
FIG. 6 shows an embodiment of how a pipeline may be used to perform store-forwarding, using metadata in accordance with one embodiment of the invention.

FIG. 6 of the drawings shows an embodiment of how the pipeline 202 of FIG. 2 may be used to perform store-forwarding. Referring to FIG. 6, instructions 600 comprising metadata in the form of an instruction tag 600A are fed into the pipeline 202, where an operand read operation 502, an execution operation 504, and a write result operation 206 are performed. In order to achieve store-forwarding from memory order buffer 608, a type tag and an address tag combination 610 is used as a key to search memory order buffers 610 in order to identify uncompleted pending store operations in order to perform store-forwarding. In one embodiment, a type tag may be used to select from different typed memory store buffers. In another embodiment, the type tag can be used to tag store buffer entries within a memory store buffer. In matching tags for store forwarding, the tags can be used exclusively or can be combined with any number of bits of the actual address. This is shown in FIG. 6 of the drawings, where an address tag 620 is used as an index into one or more memory order buffers 622 in order to find a partially matching address tag. A type tag 624 associated with the address tag 620 is then used in combination with the address tag 620 in order to identify uncompleted store operations for forwarding.

In the store-forwarding operation described above the type information is available when an instruction is decoded, allowing store-forwarding to be scheduled much earlier in a pipeline and before address calculation for operands begins.

Figure 7:
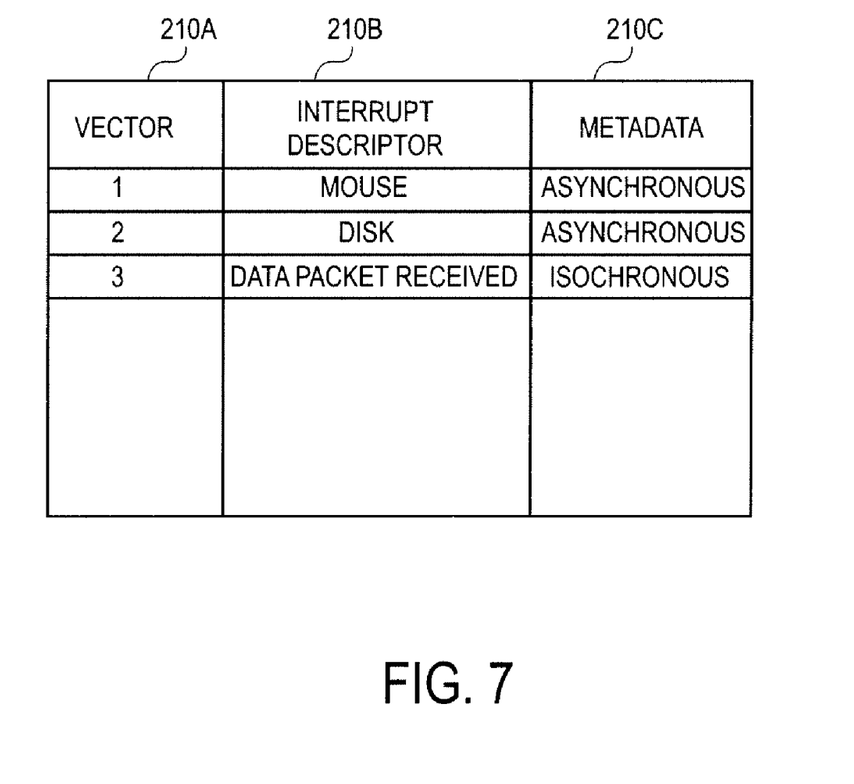
FIG. 7 shows an example of a descriptor table implemented in the processor of the system of FIG. 1.

Referring again to FIG. 2 of the drawings, in one embodiment, the processor 102 includes an interrupt descriptor table 210. FIG. 7 shows an illustrative example of the interrupt descriptor table 210. As will be seen, the interrupt descriptor table includes a vector column 210A, which defines a numeric index into the descriptor table. The table also includes an interrupt descriptor column 210B, and a metadata column 210C. The interrupt descriptor column 210B contains descriptions of a particular interrupt, whereas the metadata column 210C contains a metadata tag associated with particular interrupts. In one embodiment, the processor 102 supports an instruction that provides an architecturally visible mechanism to a software program to allow a programmer to populate the interrupt descriptor table 210. For example, the instruction may be of the format:

write_event_hint, vector, hint, where the value for hint corresponds to the values of the metadata column 210C. In one embodiment, the metadata hints of 210C comprise time scale sensitivity values associated with the interrupts described in column 210A, in order to assist the processor to prioritize interrupts. For example, in one embodiment, the hints may specify that a particular descriptor fall into one of the following categories, namely synchronous, asynchronous, and isochronous. Or the hints indicate the time scale of events of interest. In operation, interrupts detected by the logic 202D of FIG. 2 results in the processor accessing the interrupt descriptor table 210 to discover the time scale sensitivity associated with the interrupt, thereby determining order or priority for processing simultaneous interrupts.

In describing the processor 102, components not necessary in order to describe embodiments of the present invention have been omitted, but one skilled in the art will necessarily appreciate that these components are part of the processor 102.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A computer-implemented method, comprising:
fetching an instruction of a stored program having an opcode and a compiler-generated processing hint, wherein the compiler-generated processing hint is to facilitate faster performance of the program than that of the program without the compiler-generated processing hint, wherein the compiler-generated processing hint comprises static metadata that is not produced dynamically during execution of the stored program, wherein the static metadata comprises a metadata tag, the metadata tag including time scale sensitivity information for an interrupt;
decoding the instruction;
scheduling the decoded instruction; and
executing the instruction according to the opcode which causes the time scale sensitivity information to be written into an interrupt descriptor table;
prioritizing processing of simultaneous interrupts by accessing the interrupt descriptor table to discover the time scale sensitivity information relating to the simultaneous interrupts.

2. The method of claim 1, further comprising:
fetching a second instruction of the stored program having a second opcode and a second compiler-generated processing hint;
decoding the second instruction;
scheduling the second instruction based on the second compiler-generated processing hint, including:
determining if the operation of the second instruction aliases with an operation of another instruction without calculating the address of an operand in the second instruction by accessing an alias table having a memory range to metadata mapping using the second compiler-generated processing hint; and
scheduling the second instruction for out-of-order execution before commencing address calculation of the second operand in the second instruction when the operations do not alias; and
executing the second instruction according to the second opcode.

3. The method of claim 1, further comprising:
fetching a second instruction of the stored program having a second opcode and a second compiler-generated processing hint;
decoding the second instruction;
scheduling the second instruction based on the second compiler-generated processing hint, including allocating resources for the exclusive use of the second instruction based on the second compiler-generated processing hint; and
executing the second instruction according to the second opcode.

4. A computer-implemented method, comprising:
fetching a plurality of instructions of a stored program each having an opcode and a compiler-generated processing hint,
wherein each of the compiler-generated processing hints comprises static metadata that is not produced dynamically during execution of the stored program, wherein each of the compiler-generator processing hints comprises a type tag;
sending the plurality of instructions into an execution pipeline; and
for at least one of the plurality of instructions, searching a memory store buffer that is coupled to a unit in the pipeline that retires the instructions using the type tag and an address tag of the at least one of the plurality of instructions to identify an uncompleted pending store operation in order to perform a store-forwarding operation.

5. The method of claim 4, wherein the type tag is used to select one of a plurality of different memory store buffers.

6. The method of claim 4, wherein the type tag is used to select an entry within the memory store buffer.

7. The method of claim 4, wherein the address tag is used as an index into the memory store buffer to find a partially matching address tag, and the type tag associated with the address tag is used in combination with the address tag in order to identify the uncompleted pending store operation.

8. A processor implemented on a semiconductor chip, comprising:
an instruction cache to store instructions of a program, said instructions each having an opcode, and wherein a plurality of the instructions comprise compiler-generated processing hints encoded therein, wherein the compiler-generated processing hints are to facilitate faster performance of the program than that without the compiler-generated processing hints, wherein each of the compiler-generated processing hints comprises static metadata that is not produced dynamically during execution of the instructions;
a processing pipeline comprising:
fetch and decode logic to fetch and decode the instructions from the instruction cache;
scheduling logic to schedule the instructions for instruction execution;
executing logic to execute the instructions according to the opcodes;
write back logic to retire each of the instructions after execution;
and memory store buffers coupled to the write back logic, wherein the scheduling logic is configured to implement a type based scheduler that creates a plurality of parallel independent streams,
and wherein the static metadata of the plurality of instructions comprises a type tag which when combined with an address tag is to be used as a key to search the memory store buffers to identify uncompleted pending store operations in order to perform a store-forwarding operation.

9. The processor of claim 8, wherein the processor further comprises logic to process interrupts, and wherein the processor further comprises an interrupt descriptor table, comprising:
a vector column which defines a numeric index into the interrupt descriptor table;
an interrupt descriptor column that contains descriptions of a particular interrupt; and
a metadata column that contains metadata tags comprising time scale sensitivity information, and wherein the logic is configured to access the interrupt descriptor table to discover the time scale sensitivity information to determine a priority for processing simultaneous interrupts.

10. The processor of claim 8, wherein the static metadata of the instructions comprises a metadata tag having disambiguating information that allows the processor to make a determination that a first instruction of the plurality of instructions is not dependent upon a second instruction of the plurality of instructions without calculating an address of an operand of the first instruction.

11. The processor of claim 10, wherein the scheduling logic is to schedule the execution of the first instruction before execution of the second instruction based on the determination.

12. The processor of claim 10, wherein the scheduling logic is to schedule the execution of the first instruction to be executed by another processing pipeline based on the determination.

13. The processor of claim 8, wherein the processing pipeline further comprises allocation logic to allocate one or more resources for the exclusive use of a set of one or more of the plurality of instructions based on the compiler-generated processing hints, and wherein the allocation logic is to allocate particular memory registers for the exclusive use in processing the set of instructions, the set of instructions having a particular metadata tag associated therewith.

14. The processor of claim 8, further comprising:
an alias table containing a mapping between memory tags and memory ranges; and
a memory scheduling pipeline coupled to the processing pipeline,
the memory scheduling pipeline to access the alias table to determine a first memory range corresponding to a first memory tag of a first instruction and a second memory range corresponding to a second memory tag of a second instruction.

15. The processor of claim 8, wherein the processing pipeline further comprises allocation logic to allocate one or more resources for the exclusive use of a set of one or more of the plurality of instructions based on the compiler-generated processing hints, and wherein the processor further comprises a second processing pipeline, wherein the processing pipeline is to perform arithmetic and logical operations and the second processing pipeline is to perform address calculation for references or pointers, wherein the static metadata of each instruction of the set of instructions comprises a reference hint, wherein the allocation logic is configured to implement a reference checking stage that checks a reference hint associated with a particular instruction and steers the particular instruction into one of the processing pipeline or the second processing pipeline based on the reference hint.

* * * * *